3,021,332
PYRIDO (2,3-d) PYRIMIDINE COMPOUNDS
AND METHOD OF MAKING
George H. Hitchings, Yonkers, N.Y., and Roland K. Robins, Tempe, Ariz., assignors to Burroughs Wellcome & Co. (U.S.A.) Inc., Tuckahoe, N.Y., a corporation of New York
No Drawing. Filed Jan. 9, 1958, Ser. No. 707,853
Claims priority, application Great Britain Jan. 4, 1954
5 Claims. (Cl. 260—256.4)

This invention relates to a new group of pyrido (2,3-d) pyrimidines and a new method for the preparation of derivatives of this ring system. They also are of value as inhibitors of micro-organisms, and they have specific activity especially against plasmodia and *Proteous vulgaris*. The latter organism is highly resistant to known chemotherapeutic agents. This property is especially marked in the 2,4-diamino derivatives bearing alkyl or aryl substituents in the pyridine moiety. The compounds are important pharmaceutical intermediates in the preparation of the diamino compounds of a concurrently filed application by the same inventors.

The invention is particularly concerned with a group of compounds which falls within the general Formula I, in which X and Y are selected from the class consisting of amino, phenoxy, lower alkyl and dialkylamino, arylamino, chloro and mercapto groups and one of them can be hydroxy but both cannot be amino; $R_1$ is selected from class consisting of hydrogen, lower alkyl and aryl groups, $R_2$ is selected from the class consisting of hydrogen and lower alkyl groups, $R_3$ is selected from the class consisting of lower alkyl and aryl groups, $R_2$ and $R_3$ together are selected from the class of divalent radicals consisting of trimethylene and tetramethylene.

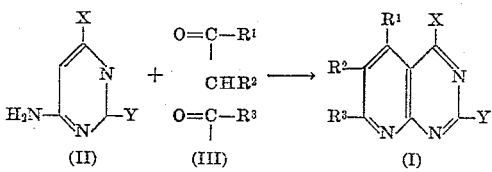

The new method of preparation of derivatives of the pyrido (2,3-d) pyrimidine system consists in the condensation of a 4-aminopyrimidine with a β-dicarbonyl reagent. The pyrimidines are selected from the group of 4-aminopyrimidines having 2,6-diamino, 2,6-dihydroxy, 2-amino-6-hydroxy and 2-mercapto-6-hydroxy substituents. The dicarbonyl reagents optimally are β-diketones or β-ketoaldehydes. The condensation is carried out optimally by warming a mixture of the pyrimidine and the dicarbonyl reagent in a strongly acid medium such as phosphoric or sulphuric acid and recovering the product by dilution and neutralization.

The novel reaction of the present invention by which compounds of the general Formula I may be synthesized is shown in the above reaction between a 4-aminopyrimidine of Formula II and a β-carbonyl aldehyde or ketone of Formula III. It is found that the more reactive carbonyl reactions with the pyrimidine at the 5-position. Thus, β-ketonic aldehydes yield 7- rather than 5-substituted pyrido (2,3-d) pyrimidines.

The compounds may also be prepared, according to a further feature of the present invention, by first reacting a suitably substituted 2-amino nicotinic acid of Formula IV with urea or thiourea to give a 2:4-dihydroxy or 2-mercapto-4-hydroxy-pyrido (2,3-d) pyrimidine.

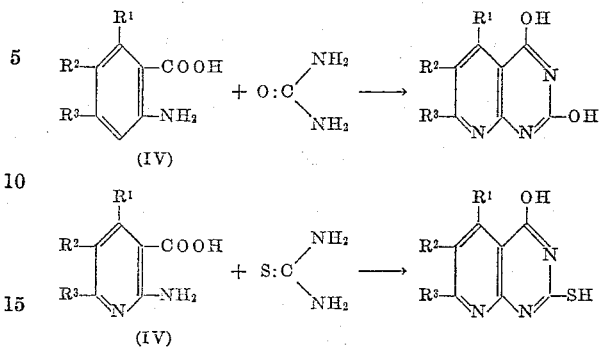

The hydroxy and mercapto groups in these compounds may undergo various further reactions to give other compounds falling within the above general Formula I. For example, treatment of the di-hydroxy compound with phosphorus oxychloride will give a di-chloro compound and this in turn by reaction with ammonia primary or secondary amines or hydrazine will give amino and substituted amino pyrido (2,3-d) pyrimidines; or with phenol, a diphenoxy compound; or with a metallic (for example sodium) hydrosulphide, a dimercapto compound.

A 2-mercapto-4-hydroxy compound can also be obtained from a 2,4-dichloro compound by reaction of the latter to give first 2-chloro-4-hydroxy compound which in turn will give, on treatment with sodium hydrosulphide, a 2-hydroxy-4-mercapto compound. Other reactions within the scope of the present invention will appear from the examples.

The following examples illustrate the teachings of this invention, without limitation of its scope which is defined in the claims.

EXAMPLE 1

*Preparation of 2,4-diamino-5,7-dimethyl pyrido (2,3-d) pyrimidine*

2,4,6-triaminopyrimidine (5 g.) and acetylacetone (3 g.) were heated with 25 ml. of 85% $H_3PO_4$ for 5 hours on the steam bath. The solution was diluted to 250 ml. and made basic to a pH of 9 with concentrated ammonium hydroxide. There deposited from the warm solution on standing colorless needles, melting point at 293–295° with decomposition (uncorrected).

EXAMPLE 2

*Preparation of 2-amino-4-hydroxy-5,7-dimethylpyrido (2,3-d) pyrimidine*

2,4-diamino-6-hydroxypyrimidine (10 g.) and 10 g. of acetylacetone were added to 50 ml. of 85% syrupy phosphoric acid and heated on the steam bath for 4 hours. The brown solution was cooled and diluted to 500 ml. and made basic to a pH of 9 with concentrated ammonium hydroxide. The crude product was filtered and purified by dissolving in dilute hydrochloric acid and precipitation with ammonium hydroxide. Yield, 7.2 g. having a melting point of about 360°.

EXAMPLE 3

*Preparation of 2,4-dihydroxy-5,7-dimethylpyrido (2,3-d) pyrimidine*

2,4-dihydroxy-6-aminopyrimidine (12.7 g.) and 10 g.

of acetylacetone and 60 ml. of $H_3PO_4$ were heated 5½ hours on the steam bath. The crude reaction mixture was diluted with 250 ml. of warm water and allowed to remain overnight. Filtration yielded 11.0 g. of product which was recrystallized from glacial acetic acid to give 7.5 g. of white crystals.

EXAMPLE 4

*Preparation of 2,4 - diamino - 6 - methyl - 7-phenylpyrido (2,3-d) pyrimidine*

2,4,6-triaminopyrimidine (12.5 g.) and 16.2 of 3-phenyl-2-methylpropan-3 one-1-al (Berichte, vol. 22, page 3276) were added to 70 ml. of $H_3PO_4$ and heated on the steam bath for 5 hours. The solution was diluted to 500 ml. with water and made basic to a pH of 9 with concentrated ammonium hydroxide. The precipitate was filtered and washed and suspended in 100 ml. of 2 N sodium hydroxide and heated 1 hour on the steam bath and filtered. The precipitate was recrystallized from ethanol-water mixture. Yield, 2.5 g., having a melting point of 287–290°. A small amount was crystallized from absolute ethanol for analysis.

EXAMPLE 5

*Preparation of 2,4-diamino-6-methyl-7-ethylpyrido (2,3-d) pyrimidine*

6.3 g. of 2,4,6-triaminopyrimidine and 6.8 g. of the sodium salt of 2-methyl-penta-3-one-1-al (Berichte, vol. 22, page 3277) and 40 ml. of 85% phosphoric acid were heated together as in Example 4 and the product worked up in a similar manner to give 2.2 g. of product, melting at 304–305°.

EXAMPLE 6

*Preparation of 2,4-diamino-7-(p-chlorophenyl) pyrido (2,3-d) pyrimidine*

6.3 g. of 2,4,6-triaminopyrimidine and 10.2 g. of the sodium salt of 3-(p-chlorophenyl) propan-3-one-1-al (Berichte, vol. 61, page 2253) and 120 ml. of 85% $H_3PO_4$ were heated 4 hours on the steam bath and reaction mixture worked up as in Example 4 to give 1.6 g. of a product, melting at 311°.

EXAMPLE 7

*Preparation of 2,4-diamino-7-phenylpyrido (2,3-d) pyrimidine*

The preparation of this compound was carried out as in Example 6 using 6 g. of triaminopyrimidine and 10 g. of 3-phenyl-propane-3-one-1-al, to yield yellow needles, having a melting point of 289–290°.

EXAMPLE 8

*Preparation of 2,4-diamino-5,7-diphenylpyrido (2,3-d) pyrimidine*

This preparation was carried out as in Example 1 substituting 7 g. dibenzoylmethane for the acetylacetone, to yield yellow prisms, having a melting point of 288–290°.

EXAMPLE 9

*Preparation of 2,4-dihydroxy-5,6,7-trimethylpyrido (2,3-d) pyrimidine*

The preparation was carried out using methylacetylacetone in a manner similar to that employed in Example 3 to yield a compound, melting at 308–310°.

EXAMPLE 10

*Preparation of 2,4-diamino-6-ethyl-7-phenylpyrido (2,3-d) pyrimidine*

To 50 ml. of 85% $H_3PO_4$ was added 6.3 g. of 2,4,6-triaminopyrimidine and 8.8 g. of 2-ethyl-3-phenyl-propanone-3-al-1 (Berichte, vol. 22, page 3278) and solution heated on the steam bath for 4 hours and the reaction mixture worked up as in Example 4 to yield 2.1 g. of white needles, melting at 281–282°.

EXAMPLE 11

*Preparation of 2,4 - diamino - 6 - ethyl-7-n-propylpyrido (2,3-d) pyrimidine*

Eight and two tenths grams of the sodium salt of 2-ethylhexone-3-one-1-al and 63 g. of 2,4,6-triaminopyrimidine were heated in 40 ml. of phosphoric acid for 2 hours on the steam bath to yield 2.1 g. of crude product (isolated as in previous examples). Recrystallization from ethanol yielded 1.4 g., having a melting point of 197°.

EXAMPLE 12

*Preparation of 2,4-diamino-5,6,7-trimethylpyrido (2,3-d) pyrimidine*

Eight grams of 2,4-dihydroxy-5,6,7-trimethylpyrido (2,3-d) pyrimidine was added to 100 ml. of phosphorus oxychloride and the solution refluxed 2 hours, the excess phosphorus oxychloride was distilled off under reduced pressure and the syrupy residue poured on ice and extracted with chloroform. The residue from the chloroform extraction, which consisted of crude 2,4-dichloro-5,6,7-trimethylpyrido (2,3-d) pyrimidine, was heated with alcoholic ammonia at 155° overnight and the product isolated as in Example 15 to yield 0.6 g. of product, melting at 314°.

EXAMPLE 13

*Preparation of 2,4-diamino-6,7-dimethylpyrido (2,3-d) pyrimidine*

From 12.5 g. of 2,4,6-triaminopyrimidine and 12.2 g. of the sodium salt of 2-methyl butanone-3-al-1 dissolved in 100 ml. of 85% phosphoric acid and heated 4 hours on the steam bath was isolated as in Example 4, 2.4 g. of a product, melting at >350° with decomposition.

EXAMPLE 14

*Preparation of 2-mercapto-4-hydroxy-5,7-dimethylpyrido (2,3-d) pyrimidine*

To 50 ml. of 85% $H_3PO_4$ was added 14.3 g. of 2-mercapto-4-hydroxy-6-aminopyrimidine and 10.0 g. of acetylacetone. The reaction mixture was heated 4 hours on the steam bath and then diluted with 400 ml. of water and filtered and washed with water. The crude product was dissolved in dilute sodium hydroxide and precipitated with acetic acid. Yield of 2-mercapto-4-hydroxy-5,7-dimethylpyrido (2,3-d) pyrimidine was 11.5 g. melting at 285°.

EXAMPLE 15

*Preparation of 2,4-diamino-6,7-trimethylenepyrido (2,3-d) pyrimidine*

Forty-one grams of 2,4,6-triaminopyrimidine and 44 g. of the sodium salt of 2-formylcyclopentanone were heated together for 5 hours in 150 ml. of 85% phosphoric acid. The solution was then diluted to 500 ml. of water and then neutralized to a pH of 9 with concentrated ammonium hydroxide and filtered. The crude precipitate was dissolved in dilute hydrochloric acid, heated with norite, filtered and the solution made basic with sodium hydroxide. The yield was 13.0 g., melting at >360°. A small amount was recrystallized twice from ethanol-water for analysis.

EXAMPLE 16

*Preparation of 2,4-diamino-6,7-tetramethylenepyrido (2, 3-d) pyrimidine*

6.3 g. of 2,4,6-triaminopyrimidine and 6 g. of formylcyclohexanone were reacted together and the product isolated as described for the formylcyclopentanone derivative in Example 15, to give 6,7-tetramethylenepyrido (2,3-d) pyrimidine.

The following further compounds were also prepared in the above manner.

(17) 2-amino-4-hydroxy-7-phenylpyrido (2,3-d) pyrimidine melting at >360°.
(18) 2-amino-4-hydroxy-6-methyl-7-ethylpyrido (2,3-d) pyrimidine melting at 345–350°.
(19) 2-amino-4-hydroxy-6-methyl-7-n-butylpyrido (2,3-d) pyrimidine melting at >360°.
(20) 2-amino-4-hydroxy-6-methyl-7-phenylpyrido (2,3-d) pyrimidine melting at 360°.
(21) 2:4-dihydroxy-5-methyl-7-phenylpyrido (2,3-d) pyrimidine melting at 307–309°.
(22) 2:4-dihydroxy-7-p-bromphenylpyrido (2,3-d) pyrimidine melting at 360°.
(23) 2:4-dihydroxy-7-p-tolylpyrido (2,3-d) pyrimidine melting at >360°.
(24) 2:4-dihydroxy-7-p-chlorphenylpyrido (2,3-d) pyrimidine melting at >360°.
(25) 2:4-dihydroxy-7-phenylpyrido (2,3-d) pyrimidine melting at 341–342°.
(26) 2:4-dihydroxy-6-methyl-7-ethylpyrido (2,3-d) pyrimidine melting at 218–220°.
(27) 2:4-dihydroxy-6:7-dimethylpyrido (2,3-d) pyrimidine melting at 329–330°.
(28) 2:4-dihydroxy-6-phenyl-7-benzylpyrido (2,3-d) pyrimidine melting at 248–249°.
(29) 2:4-dihydroxy-6-methyl-7-n-butylpyrido (2,3-d) pyrimidine melting at 209–211°.
(30) 2:4-dihydroxy-6-methyl-7-phenylpyrido (2,3-d) pyrimidine melting at 247–249°.
(31) 2:4-dihydroxy-6-ethyl-7-n-propylpyrido (2,3-d) pyrimidine melting at 186–188°.
(32) 2:4-dihydroxy-6:7-tetramethylenepyrido (2,3-d) pyrimidine melting at 306–308°.
(33) 2-mercapto-4-hydroxy-7-p-chlorphenylpyrido (2,3-d) pyrimidine melting at 335–337°.
(34) 2-mercapto-4-hydroxy-7-phenylpyrido (2,3-d) pyrimidine melting at 310–312°.
(35) 2-mercapto-4-hydroxy-7-p-tolylpyrido (2,3-d) pyrimidine melting at 219–220°.
(36) 2-mercapto-4-hydroxy-6-isopropyl-7-isobutylpyrido (2,3-d) pyrimidine melting at 208–209°.
(37) 2-mercapto-4-hydroxy-6-ethyl-7-n-propylpyrido (2,3-d) pyrimidine melting at 217–219°.
(38) 2-mercapto-4-hydroxy-6-methyl-7-ethylpyrido (2,3-d) pyrimidine melting at 238–240°.
(39) 2-mercapto-4-hydroxy-6:7-dimethylpyrido (2,3-d) pyrimidine melting at 300–302°.
(40) 2-mercapto-4-hydroxy-5:6:7-trimethylpyrido (2,3-d) pyrimidine melting at 305–307°.
(41) 2-mercapto-4-hydroxy-6-phenyl-7-benzylpyrido (2,3-d) pyrimidine melting at 235–236°.
(42) 2-mercapto-4-hydroxy-6-methyl-7-phenylpyrido (2,3-d) pyrimidine melting at 240–242°.
(43) 2-mercapto-4-hydroxy-6-methyl-7-n-butylpyrido (2,3-d) pyrimidine melting at 224–228°.
(44) 2-mercapto-4-hydroxy-6:7-tetramethylenepyrido (2,3-d) pyrimidine melting at 252–255°.
(45) 2:4-diamino-6-ethyl-7-p-chlorphenylpyrido (2,3-d) pyrimidine melting at 258–259°.
(46) 2:4-diamino-6-propyl-7-phenylpyrido (2,3-d) pyrimidine melting at 245–247°.
(47) 2:4-diamino-6-methyl-7-n-butylpyrido (2,3-d) pyrimidine melting at 280–283°.
(48) 2:4-diamino-6-isopropyl-7-isobutylpyrido (2,3-d) pyrimidine melting at 269–270°.
(49) 2:4-diamino-6-n-butyl-7-phenylpyrido (2,3-d) pyrimidine melting at 292–293°.
(50) 2:4-diamino-6-n-propyl-7-n-butylpyrido (2,3-d) pyrimidine melting at 195–197°.
(51) 2:4-diamino-7-p-bromophenylpyrido (2,3-d) pyrimidine melting at 320°.
(52) 2:4-diamino-7-p-tolylpyrido (2,3-d) pyrimidine melting at 323–325°.
(53) 2-mercapto-4-hydroxy-5:7-dimethyl-6-ethylpyrido (2,3-d) pyrimidine melting at 253–255°.
(54) 2-hydroxy-4-mercaptopyrido (2,3-d) pyrimidine melting at 294–296°.
(55) 2-chloro-4-aminopyrido (2,3-d) pyrimidine melting at >310°.
(56) 2-chloro-4-hydroxypyrido (2,3-d) pyrimidine melting at >360°.
(57) 2-anilino-4-hydroxypyrido (2,3-d) pyrimidine melting at 350–352°.
(58) 2-chloro-4-mercaptopyrido (2,3-d) pyrimidine melting at 327–330°.
(59) 2,4-dichloro-7-phenylpyrido (2,3-d) pyrimidine melting at 253–255°.

EXAMPLE 60

*Preparation of 2,4-diaminopyrido (2,3-d) pyrimidine*

To 20 ml. of absolute ethanol saturated at 0° with dry ammonia was added 6.5 g. of crude 2,4-dichloropyrido (2,3-d) pyrimidine. The solution was then placed in a bomb and heated at 150° for 12 hours. To the alcoholic solution was then added 30 ml. of water and 10 ml. of 2 N sodium hydroxide and the solution gently warmed on the steam bath and then cooled 5 hours in the refrigerator. The precipitate was filtered, washed with a little water and recrystallized from 500 ml. of a 50% ethanol-water mixture to which had been added 0.5 ml. of 2 N sodium hydroxide. The chilled solution yielded 3.9 g. of colorless needles, melting at 356° with decomposition.

EXAMPLE 61

*Preparation of 2-chloro-4-hydroxypyrido (2,3-d) pyrimidine*

Three grams of finely pulverized 2,4-dichloropyrido (2,3-d) pyrimidine was added to 75 ml. of 1 N sodium hydroxide at room temperature. When all the 2,4-dichloropyrido (2,3-d) pyrimidine had dissolved, a small amount of norite was added and the solution allowed to stand 15 minutes at room temperature. The solution was filtered and cooled and acidified with glacial acetic acid. Upon standing overnight in the refrigerator the solution yielded 2.4 g. of tan needles. The compound did not melt below 360°.

EXAMPLE 62

*Preparation of 2-amino-4-hydroxypyrido (2,3-d) pyrimidine*

In a glass-lined bomb was placed 3.1 g. of 2-chloro-4-hydroxypyrido (2,3-d) pyrimidine and 20 ml. of alcoholic ammonia. The bomb was heated to 150° for 15 hours. The solution was then diluted with 80 ml. of water, cooled and filtered and washed with cold water. The yield of almost colorless 2-amino-4-hydroxypyrido (2,3-d) pyrimidine was 2.4 g., having a melting point of >360°.

EXAMPLE 63

*2-chloro-4-aminopyrido (2,3-d) pyrimidine*

Ten grams of 2,4-dichloropyrido (2,3-d) pyrimidine (melting point 156°–157°) was finely powdered and suspended in 300 ml. of concentrated ammonium hydroxide. The solution was carefully heated on the steam bath for two hours, cooled and filtered. The slightly yellow precipitate was then stirred with 200 ml. of 1 N sodium hydroxide for one-half hour to remove any unreacted starting material. The filtered precipitate was then washed repeatedly with water. The yield was 8.1 g. The compound decomposed when heated above 310°. No suitable recrystallization solvent could be found.

EXAMPLE 64

*2,4-dimercaptopyrido (2,3-d) pyrimidine*

METHOD A

Four grams of 2,4-dichloropyrido (2,3-d) pyrimidine was added slowly with stirring to 150 ml. of 4 N sodium hydrosulphide. The solution was warmed for fifteen minutes on the steam bath, diluted with 100 ml. of water, cooled and acidified with acetic acid. The yellow-green precipitate was filtered and dried at 130° to yield 3.5 g. having a melting point of >360°. A small amount was purified for analysis by dissolving in dilute sodium hydroxide and precipitating with acetic acid.

METHOD B

Twenty grams of 2,4-dihydroxypyrido (2,3-d) pyrimidine and 100 g. of finely pulverized phosphorus pentasulphide and 500 ml. of tetralin were heated together for two hours at 200° to 205° (inside temperature). The solution was then cooled and filtered and the precipitate washed with Skelly-solve "B." The precipitate was dissolved in 600 ml. of cold 3 N sodium hydroxide and the solution was then acidified with an excess of acetic acid and filtered. The yellow-green precipitate was washed and dried at 130°, to yield 23.0 g. This product was identical with the material obtained by Method A as judged by the identical ultraviolet absorption spectra.

EXAMPLE 65

*Preparation of 2-mercapto-4-aminopyrido (2,3-d) pyrimidine*

METHOD A

Five grams of 2,4-dimercaptopyrido (2,3-d) pyrimidine (crude), Method B, was finely powdered and added to 150 ml. of concentrated ammonium hydroxide and the solution heated on the steam bath for two hours. All of the starting material soon dissolved and after 15 to 20 minutes a precipitate was noted. The solution was filtered hot and the product suspended in concentrated ammonium hydroxide and heated for 1 hour on the steam bath and solution filtered hot and washed with a little cold aqueous ammonia. The yield of fine yellow-green needles was 3.5 g.

METHOD B 2.3 g. of finely powdered 2-chloro-4-aminopyrido (2,3-d) pyrimidine was added slowly to a solution of 4 N NaSH and the solution heated on the steam bath for 2 hours during which time a small amount of hydrogen sulphide was continually bubbled through the solution. The solution was then heated with charcoal, filtered and acidified with acetic acid. The product was purified by dissolving in dilute sodium hydroxide and precipitating with acetic acid. Yield was 1.5 g. The ultraviolet absorption spectrum was that of the substance prepared by Method A.

EXAMPLE 66

*Preparation of 2-mercapto-4-hydroxypyrido (2,3-d) pyrimidine*

METHOD A

Twenty grams of α-aminonicotinic acid and 30 g. of thiourea were heated together at 200° (temp. of melt). The clear yellow melt thickened as the temperature was gradually raised to 210° and after 5 minutes at 210°, the heating was discontinued. The solution was dissolved in dilute sodium hydroxide and the solution diluted at 350 ml. and heated on the steam bath while being saturated with carbon dioxide. The solution was then cooled and filtered and the precipitate washed with cold water. Yield was 5.0 g. The product was purified by suspension in 400 ml. of hot water and enough dilute sodium hydroxide added to effect solution. The hot solution was acidified with acetic acid and the solution was filtered hot to yield 2.3 g. of white powder, having a melting point of 355°–356°.

METHOD B

Three hundred milligrams of 2-chloro-4-hydroxypyrido (2,3-d) pyrimidine was warmed with 4 N NaSH on the steam bath. The solution was filtered and acidified with acetic acid and purified by dissolving in dilute sodium hydroxide and precipitating from the hot solution with acetic acid. Yield was 230 milligrams. The melting point and mixed melting point with the 2-mercapto-4-hydroxy compound prepared by Method A was 355°-356° (unc.). Ultraviolet absorption spectra of the two products (Method A and Method B) were identical.

METHOD C 2-mercapto-4-aminopyrido (2,3-d) pyrimidine 0.5 g. was suspended in 25 ml. of 2 N hydrochloric acid and the solution heated 2.5 hours on the steam bath. The solution was filtered and the precipitate washed with water. Yield was 0.42 g. This product was identical with that obtained by Methods A and B, as judged by mixed melting point and ultraviolet absorption data.

EXAMPLE 67

*Preparation of 2,4-diphenoxypyrido (2,3-d) pyrimidine*

To a solution of 3 g. of potassium hydroxide in 30 ml. of phenol was added 4.0 g. of 2,4-dichloropyrido (2,3-d) pyrimidine slowly over a period of 10 minutes. The reaction mixture was maintained at 40°–50° during this addition and then gradually heated to 80°. The reacton mixture was poured into 200 ml. of 2 N sodium hydroxide and the cold solution filtered and washed with cold water. The crude precipitate was recrystallized from 95% ethanol to yield 2.6 g. of white needles, at a melting point of 203–205°.

EXAMPLE 68

*Preparation of 2,4-dianilinopyrido (2,3-d) pyrimidine*

To 25 ml. of water and 5 g. of aniline was added carefully with shaking, 2.0 g. of 2,4-dichloropyrido (2,3-d) pyrimidine and the solution was heated for 3 hours on the steam bath. The solution was made basic with concentrated ammonium hydroxide, filtered and washed once with cold ethanol. This crude product contained about one molecule of hydrochloric acid for two of the base. The crude mixture was suspended in 100 ml. of hot normal sodium hydroxide and enough alcohol added to effect solution. Upon cooling 2.1 g. of light green needles, having a melting point of 235°–237° was isolated. The compound was recrystallized from ethanol-water mixture with no change in melting point.

EXAMPLE 69

*Preparation of 2,4-bis(dimethylamino) pyrido (2,3-d) pyrimidine*

To 30 ml. of 25% solution of aqueous dimethylamine was added 5.0 g. of 2,4-dichloropyrido (2,3-d) pyrimidine and the solution was then heated 2 hours on the steam bath. The solution was then allowed to evaporate to dryness and the residue dissolved in 200 ml. of water and the solution made strongly basic with sodium hydroxide and extracted twice with 200 ml. of chloroform. The chloroform was washed with water and dried over anhydrous magnesium sulphate. Evaporation of the chloroform left a brown oil which solidified on cooling. Repeated extraction of this residue with boiling Skelly "C" and concentration of the solution yielded upon cooling 2.9 g. of white crystals having a melting point of 95°–97°. Recrystallization from the same solvent raised the melting point to 97–99°.

EXAMPLE 70

*Preparation of 2,4-dihydrazinopyrido (2,3-d) pyrimidine*

To 20 ml. of 85% hydrazine was added very slowly 5.0 g. of 2,4-dichloropyrido (2,3-d) pyrimidine and the solution was heated for 2 hours on the steam bath, cooled and filtered, washed with ethanol and purified by Soxhlet extraction using absolute ethanol as a solvent. Yield was of small orange needles with 1.6 g. melting point at 348–350° with decomposition.

EXAMPLE 71

*Preparation of 2-anilino-4-hydroxypyrido (2,3-d) pyrimidine*

To 0.5 g. of aniline in 25 ml. of water was added 0.5 g. of 2-chloro-4-hydroxypyrido (2,3-d) pyrimidine (Example 2). The solution was heated one hour on the steam bath and then a little sodium hydroxide was added and the basis solution was extracted with ether to remove the excess aniline. The basic solution was then carefully acidified with acetic acid to yield 0.4 g. of light green product. Recrystallization from glacial acetic acid yielded light yellow-green needles, having a melting point of 350–352°.

EXAMPLE 72

*2,4-dihydroxy-7-methylpyrido (2,3-d) pyrimidine*

Twenty grams of 6-methyl-2-aminonicotinic acid and 45 g. of urea were heated together for 180°–200° until the melt was clear. The temperature was gradually raised to 220° and the heating discontinued when the mixture thickened. The cooled solid was dissolved in 350 ml. of hot 4 N sodium hydroxide and the warm solution saturated with carbon dioxide. The cooled solution was filtered and washed with cold water; yield was 14.6 g. Three grams of the crude product was recrystallized from glacial acetic acid to give 2.7 g., having a melting point of 314–315°.

EXAMPLE 73

*Preparation of 2,4-dichloro-7-methylpyrido (2,3-d) pyrimidine*

To 250 ml. of phosphorus oxychloride was added 10 g. of crude 2,4-dihydroxy-7-methylpyrido (2,3-d) pyrimidine and the solution was refluxed for 2½ hours. The excess phosphorus oxychloride was distilled off under vacuum and the syrupy residue poured on ice and extracted with chloroform. Evaporation of the chloroform yielded 1.7 g. of crude purple-red product, having a melting point of 155–160°.

A small amount was recrystallized from heptane to yield orange plates, having a melting point of 164–169°.

EXAMPLE 74

*Preparation of 2,4-diamino-7-methylpyrido (2,3-d) pyrimidine*

To 20 ml. of alcoholic ammonia (saturated at 0° C.) was added 1.2 g. of crude 2,4-dichloro-7-methylpyrido (2,3-d) pyrimidine and the solution heated overnight in a bomb at 155°. The excess alcohol and ammonia were evaporated on the steam bath and the residue suspended in 30 ml. of normal sodium hydroxide. The solution was filtered and recrystallized from an ethanol-water mixture. The yield of slightly yellow colored needles melting at 315° with decomposition was 0.5 g.

EXAMPLE 75

*Preparation of 2:4-dihydroxy-6:7-dimethylpyrido (2,3-d) pyrimidine*

This compound was prepared from 5:6-dimethyl-2-aminonicotinic acid and urea by the method of Example 72.

EXAMPLE 76

*Preparation of 4-hydroxy-2-mercapto-6:7-dimethylpyrido (2,3-d) pyrimidine*

This compound was prepared from 5:6-dimethyl-2-aminonicotinic acid and thiourea by the method of Example 66, Method A, and melted at 300–302°.

EXAMPLE 77

*Preparation of 2:4 - dihydroxy-5-methyl-7-phenylpyridopyrimidine*

This compound was prepared by the reaction of 4-methyl-6-phenyl-2-aminonicotinic acid and urea by the method of Example 72 and melted at 307–309°.

This application is a continuation-in-part of our copending applications Serial Nos. 329,474, 329,475, and 329,476, filed January 2, 1953, now Patents Numbers 2,749,344; 2,749,345 and 2,697,710 and Serial No. 464,625 filed October 25, 1954, now abandoned.

What is claimed is:
1. 2-amino-4-hydroxy-7-phenylpyrido (2,3-d) pyrimidine.
2. 2- amino-4-hydroxy-6-methyl-7-ethylpyrido 2,3-d) pyrimidine.
3. 2-amino-4-hydroxy-6-methyl-7-n-butylpyrido (2,3-d) pyrimidine.
4. 2-amino-4-hydroxy-6-methyl-7-phenylpyrido (2,3-d) pyrimidine.
5. 2:4-dihydroxy-5-methyl-7-phenylpyrido (2,3-d) pyrimidine.

References Cited in the file of this patent

Klisiecki et al.: Roczniki Chem., vol. 3, pages 251–260 (1923).

McLean et al.: J. Chem. Soc. (London), 1949, pages 2582–2585.